June 26, 1923.  
S. W. BALCH  
1,459,710  
COMBINED SIDERIAL AND MEAN SOLAR TIMEPIECE  
Filed May 24, 1919  3 Sheets-Sheet 1

Inventor  
Samuel W. Balch

June 26, 1923.

S. W. BALCH 1,459,710

COMBINED SIDERIAL AND MEAN SOLAR TIMEPIECE

Filed May 24, 1919

Inventor,
Samuel W. Balch

June 26, 1923.                          1,459,710
S. W. BALCH
COMBINED SIDERIAL AND MEAN SOLAR TIMEPIECE
Filed May 24, 1919        3 Sheets-Sheet 3
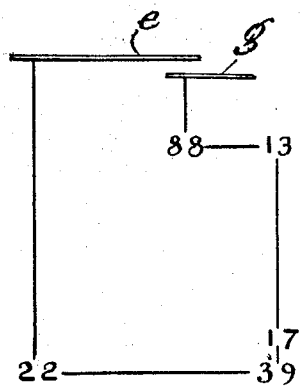
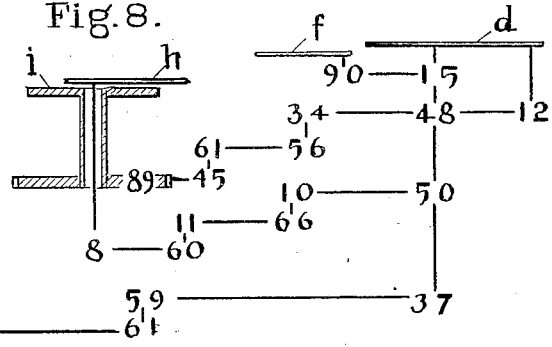
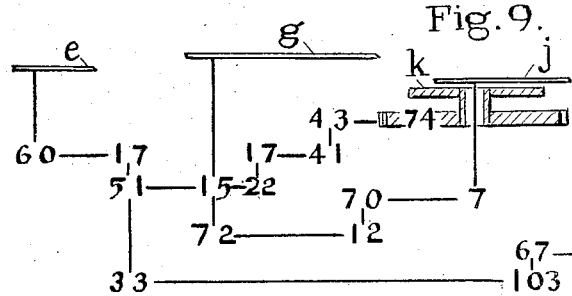
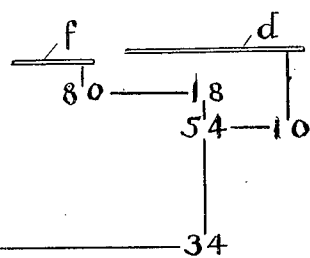
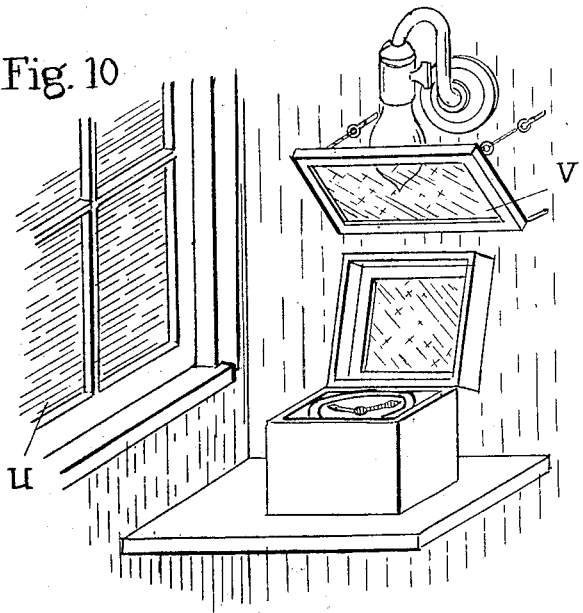
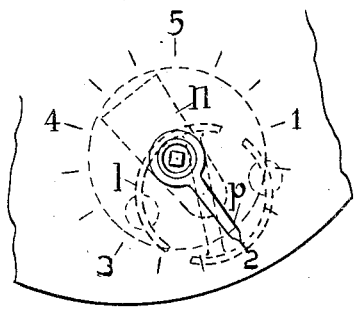
Inventor,
Samuel W. Balch Patented June 26, 1923.

1,459,710

UNITED STATES PATENT OFFICE.

SAMUEL W. BALCH, OF MONTCLAIR, NEW JERSEY.

COMBINED SIDEREAL AND MEAN SOLAR TIMEPIECE.

Application filed May 24, 1919. Serial No. 299,408.

*To all whom it may concern:*

Be it known that I, SAMUEL W. BALCH, a citizen of the United States of America, and a resident of Montclair, in the county of Essex and State of New Jersey, have invented certain new and useful Improvements in a Combined Sidereal and Mean Solar Timepiece, of which the following is a specification.

The object of this invention is to provide an instrument for determining the relation between sidereal and mean solar time. A further object is to provide for the driving of the instrument according to either time whereby both kinds of time will be concurrently indicated. A further object is to provide for the accurate setting forward or backward of the driving mechanism without introducing any disturbance that would tend to alter its rate. A further object is to provide for a record of the amount of the setting. A further object is to provide means for rendering the elements which indicate either kind of time conspicuous and the elements which indicate the other kind of time inconspicuous.

Claim to the mechanism for setting is reserved for my Patents Nos. 1,375,347 and 1,375,348, issued April 19, 1921.

In the accompanying three sheets of drawings which form a part of this application—

Figure 8 is a diagram of the gear connections between the time indicating elements shown in the preceding figures in which the seconds hand is driven according to sidereal time.

Figure 9 is a diagram of gear connections for a modification in which the seconds hand is driven according to mean solar time.

Figure 10 shows the timepiece placed for illumination by either daylight or artificial light which is contrastingly colored so as to render the elements of the desired time indications conspicuous.

Figure 11 shows a portion of the back of the timepiece with the indicator which shows the amount which the timepiece is altered.

Sidereal and mean solar time are by definition so related that at intervals of a year comprised between successive returns to the vernal equinox they coincide. In solar days the year is at present 365.2421976, and in sidereal days it is one more. An extremely close expression of this ratio is 46751:46879. Approximations with fewer digits are 1461:1465, and 365:366. A large number of close ratios may be found by combining these numbers in the formula $$\frac{46751a + 1461b + 365c}{46879a + 1465b + 366c}$$

and assigning such values to $a$, $b$, and $c$ that the last two terms in each member of the ratio will be small with reference to the first term. However, but a small proportion of the expressions for the ratio thus found can be utilized for gear trains on account of large primes being contained in one or the other of the members of the ratio. Below are two examples of factorable ratios and their factors.

$$\frac{59534}{59697} = \frac{103 \times 17 \times 17 \times 2}{67 \times 27 \times 11 \times 3}$$

$$\frac{88023}{88264} = \frac{61 \times 37 \times 13 \times 3}{59 \times 17 \times 11 \times 8}$$

The errors are respectively 0.69 and 0.36 seconds per year, each too small to be noticeable at the minute hands in such a lapse of time as the mechanism may be expected to run without being taken apart for cleaning. For the purpose of constructing gear trains the smaller numbers need to be increased by equal factors in the numerator and denominator, and by doing this and rearranging the following equivalent to the second of the above ratios has been found—

$$\frac{12}{48} \times \frac{37}{59} \times \frac{61}{17} \times \frac{39}{22}$$

Figure 1:
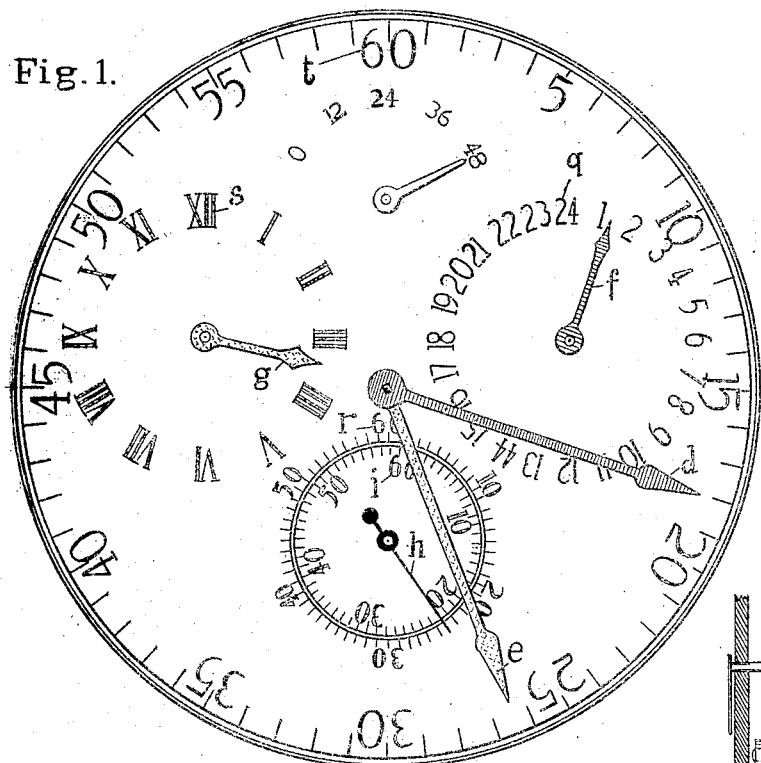
Figure 1 shows the face of a timepiece which embodies this invention.
Figure 2:
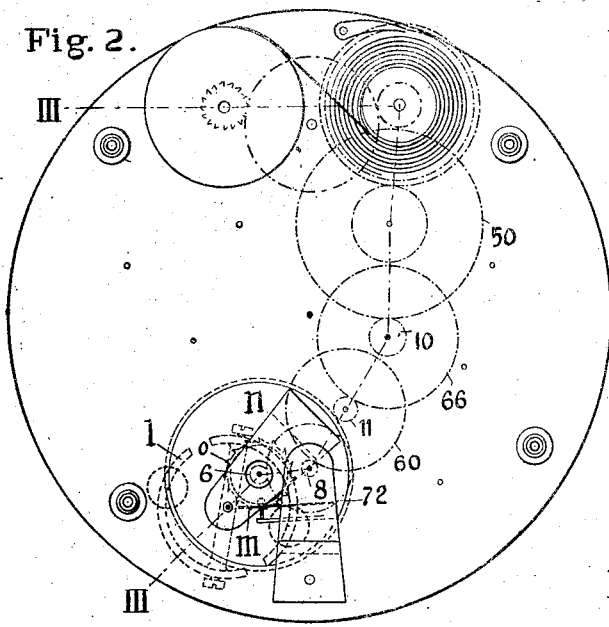
Figure 2 is a front view of that portion of the works by which the driving is effected.
Figure 3:
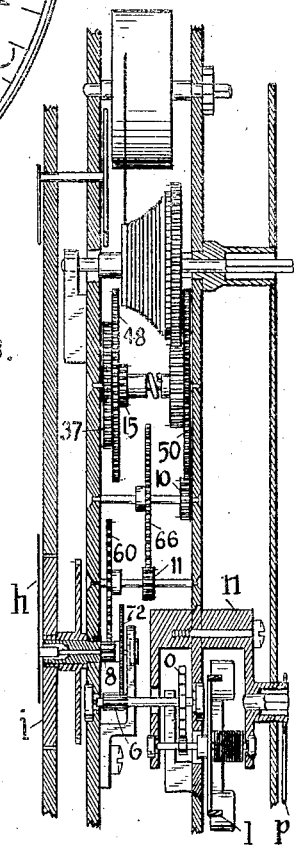
Figure 3 is a section on the line III—III of Fig. 2, showing the driving portion of the works.
Figure 4:
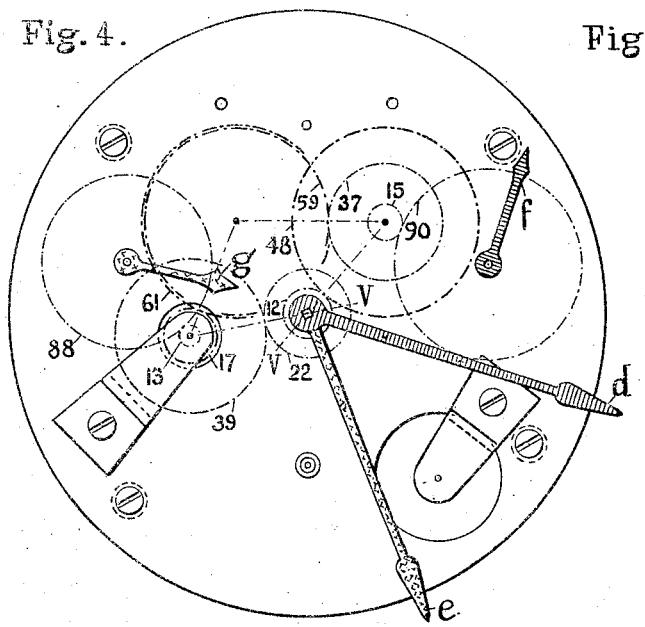
Figure 4 is a front view of that portion of the works by which the hour and minute hands of the two times are connected.
Figure 5:
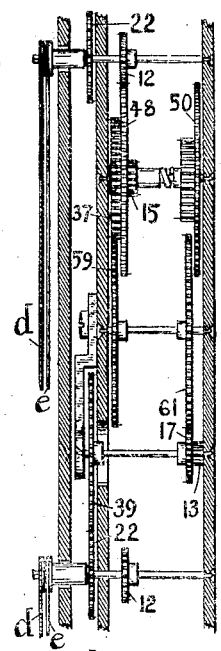
Figure 5 is a section on the line V—V of Fig. 4, showing how the minute hands are connected.

The numbers of teeth are attached to the gears in the drawings, and the train using the ratio as thus factored is shown in Figs. 4, 5 and 8, in which the first gear 12 is connected through its spindle to the sidereal minute hand $d$, and the last gear 22 is connected through its sleeve to the meantime minute hand $e$. A gear train $$\frac{12}{48} \times \frac{15}{90}$$

connects the spindle of the sidereal minute hand with the spindle of the sidereal hour hand $f$, in the ratio 1:24, and a gear train $$\frac{22}{39} \times \frac{13}{88}$$

connects the sleeve of the meantime minute hand with the spindle of the meantime hour hand $g$, in the ratio 1:12. It will be seen that each of these last two trains have two gears in common with the first train so that only one spindle with two gears needs to be added to effect the connection between hour and minute hands showing the two kinds of time with inappreciable error.

In mechanism which it is desired to drive with a high degree of precision the weight and number of fast moving parts needs to be kept down, and for this reason the above connections are not advisable between spindles which turn faster than the minute hands of the two times and only the time which is directly controlled by the driving train is provided with a seconds hand. The controlling time being sidereal, the seconds hand is a sidereal seconds hand $h$. Under this seconds hand is a revolving meantime seconds dial $i$ which makes approximately four turns a day, and against which the sidereal seconds hand shows meantime seconds to the nearest beat. The ratio between the dial and the hand is the ratio between the difference and the larger of any two numbers which express the ratio between the two kinds of time. Below is an example of an available ratio, the differential ratio derived from it, and its factors.

$$\frac{92041}{92293}, \quad \frac{252}{92293} = \frac{9 \times 7 \times 2 \times 2}{89 \times 61 \times 17 \times 1}$$

This has an error of 0.03 second per year. Since the time to be shown on the revolving dial is mean time which has longer seconds than sidereal time according to which the hand is driven, the dial must be driven in the same direction and an even number of pairs of meshing gears must be provided in the train. As it is more convenient to connect the train between the spindle of the sidereal minute hand and the dial, the factors of the difference are increased by factors of 60 and the following equivalent has been formed—

$$\frac{12}{48} \times \frac{48}{34} \times \frac{56}{61} \times \frac{45}{89}.$$

Figure 6:
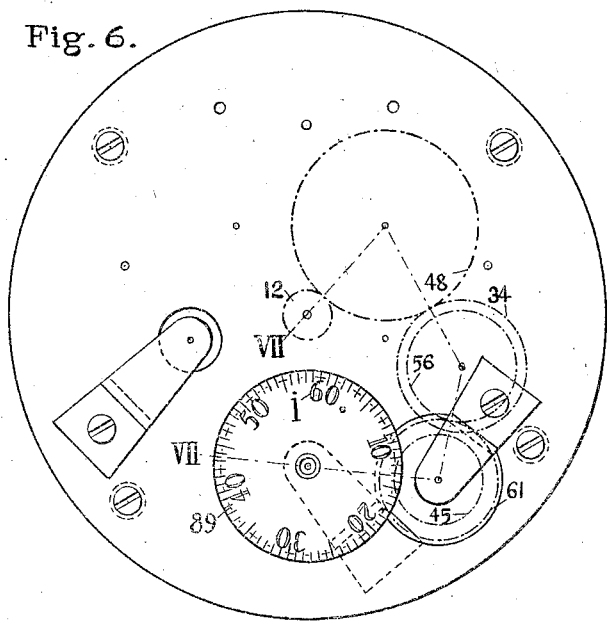
Figure 6 is a front view of that portion of the works by which the sidereal minute hand and the meantime seconds dial are connected.
Figure 7:
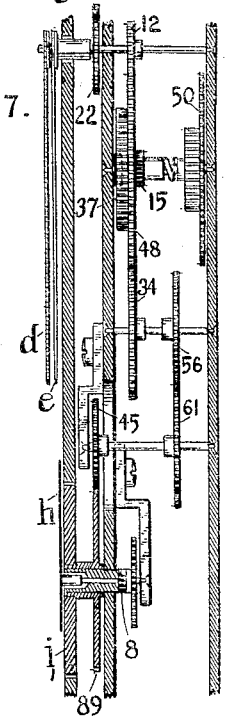
Figure 7 is a section on the line VII—VII of Fig. 6, showing how the sidereal minute hand and the meantime seconds dial are connected.

The gear train using the ratio as thus factored is shown in Figs. 6, 7 and 8, in which the first gear 12 of the train is on the spindle of the sidereal minute hand, and the last gear 89 is connected to the meantime seconds dial.

In the foregoing arrangement it is convenient to transfer motion from the driving train to the sidereal and meantime minute and hour hands and to the meantime seconds dial through the intermediate spindle between the sidereal minute wheel and the sidereal hour wheel, and the gears 15, 37, 48 through which the motion is transmitted are positively connected together but are frictionally connected to the driving train so that these hands and the dial may be concurrently set without setting the seconds hand which is connected directly to the driving train.

It is immaterial to the operation of the direct gear train between the two kinds of time whether the controlling time is regulated to sidereal time and immediately connected to the sidereal minute and hour hands, or to mean time and immediately connected to the meantime minute and hour hands, except that by selecting a train with the same numbers of teeth in some of the gears as are in correspondingly positioned gears in an available differential train, such gears may be used in both trains and the mechanism simplied. An arrangement of gears in which mean time is the controlling time is shown diagrammatically in Fig. 9. In this a suitable direct gear train is found by taking the reciprocal, expanding, and rearranging the factors of the first of the above ratios for direct gear trains in the following manner—

$$\frac{15}{51} \times \frac{33}{103} \times \frac{67}{34} \times \frac{54}{10}.$$

The first gear 15 is connected to the spindle of the meantime minute hand $e$, and the last gear 10 is connected to the sleeve of the sidereal minute hand $d$. Connections between the spindle of the meantime minute hand and the spindle of the meantime hour hand in the ratio of 1:12 is by a train $$\frac{15}{51} \times \frac{17}{60}$$

Connections between the sleeve of the sidereal minute hand and the spindle of the meantime hour hand in the ratio 1:24 is by a train $$\frac{10}{54} \times \frac{18}{80}.$$

In this selection of gear trains also, each of the two latter trains have two gears in common with the gears which connect the two kinds of time and allow of a consequent saving in mechanism.

The meantime seconds hand $j$ has under it a revolving sidereal seconds dial $k$. The ratio between the dial and the hand in this case is the ratio between the difference and the smaller of any two numbers which express the ratio between the two kinds of time. The following has been selected as an available ratio, the differential ratio derived from it and its factors—

$$\frac{266992}{267723}, \quad \frac{731}{266992} = \frac{43 \times 17 \times 1}{74 \times 82 \times 44}$$

This has an error of 0.015 seconds per year. In this case the time to be shown on the revolving dial is sidereal time which has shorter seconds than mean time according to which the hand is driven, so the dial must be driven in the opposite direction and an odd number of pairs of meshing gears must be provided in the train. In order that the train may be connected between the spindle of the meantime minute hand and the dial the ratio is altered by multiplying by factors of 60 to the terms and rearranging the factors as follows—

$$\frac{15}{22} \times \frac{17}{41} \times \frac{43}{74}.$$

The first gear 15 of the train is on the spindle of the meantime minute hand and the last gear 74 is connected to the dial. The first gear is also in two of the other trains, the gear trains having been chosen so as to permit of this. The gears of the driving train which are noted are, 72, 12, 70 and 7. These connect the spindle of the meantime seconds hand with the spindle of the meantime minute hand in the ratio 60:1. In this as in the first described form the first mentioned gear of the driving train is frictionally connected with the other trains, so as to allow the other trains to be set to the nearest minute independently of the driving train.

Provision for correcting errors of less than a minute is made by mounting the balance wheel $l$ and the detent-pallet $m$ on a circularly adjustable frame $n$, the center of which coincides with the axis of the escape wheel $o$. The frame is provided with a post which projects through the back plate of the timepiece and carries a pointer $p$ which moves over graduations on the back plate when the frame is adjusted. These graduations are the same in number as the teeth in the escape wheel and each interval between graduations denotes an adjustment equal to one beat of the balance wheel. It is therefore desirable that the escape-wheel teeth and the graduations be of such number as will be divisible by the number of beats per second made by the balance wheel so that a whole number of seconds will be comprised in the circle of graduations. The graduations afford a means for accurately ascertaining the rate of the timepiece over an extended interval and at the same time permit of the timepiece being reset many times during the interval, it being merely necessary to note the position of the pointer at the commencement of the interval and compare that position with the position after setting the timepiece at the end of the interval.

For the purposes of navigation this timepiece will be consulted in the daytime for mean solar time and at night for sidereal time. As a guide, those indicating elements which are used exclusively for sidereal time, for example, the sidereal minute hand $d$, the sidereal hour hand $f$, the sidereal twenty-four hour dial $q$, and the fixed sidereal seconds dial $r$, are in whole or in part colored blue, and the indicating elements which are used exclusively for mean solar time, for example, the mean solar time minute hand $e$, the mean solar time hour hand $g$, the mean solar time twelve-hour dial $s$, and the revolving mean solar time seconds hand $i$, are colored yellow-green. The seconds hand $h$, and the minute dial $t$ are black. The timepiece is kept in a room in which a window $u$ for its daylight illumination has the color of the sidereal indicating elements, that is to say, blue so that the same color will be imparted to the white or neutral tinted ground of the dials, and these time indicating elements thereby rendered indistinct against the background of the dials, at the same time the mean solar indicating elements are deprived of their color and appear dark and conspicuous against the background. A screen $v$, of yellow-green glass is interposed between the timepiece and the source of illumination at night. In consequence this color is then imparted to the ground of the dials and the mean solar time indicating elements are thereby rendered indistinct against the background of the dials while the sidereal time indicating elements are deprived of their color and appear dark and conspicuous against the background. Under either condition of lighting the black seconds dial and the minute dial, which are used for both kinds of time, remain conspicuous. It will be seen that by this means the change in visibility from the one kind of time to the other is brought about through the natural change between night and day as the one or the other kind of time is required and without the need of the user giving thought to the matter with the consequent chance of mistake.

What I claim, is—

1. The combination of indicating means for showing sidereal minutes and hours, an intermediate spindle, a gear train which connects the two sidereal indicating means through the intermediate spindle, means for showing mean solar minutes and hours, a second intermediate spindle, a gear train which connects the two mean solar indicating means through the second intermediate spindle and gearing which connects the two sets of indicating means through the two intermediate spindles whereby the two kinds of time are properly related.

2. The combination of indicating means for showing sidereal minutes and hours, indicating means for showing mean solar minutes and hours, connecting gearing between the two indicating means, a seconds hand, gearing by which it is driven in proper time relation with the minute and hour indicating means for one of the kinds of time, a revolving seconds dial bearing indications for the seconds hand, and connections between the seconds dial and the seconds hand whereby the indications of the other kind of time are brought into conjunction with the seconds hand.

3. The combination of indicating means for showing sidereal minutes and hours, indicating means for showing mean solar minutes and hours, connecting gearing between the two indicating means, a seconds hand, gearing by which it is driven in proper time relation with the minute and hour indicating means for one of the kinds of time, a revolving seconds dial bearing indications for the seconds hand, connections between the seconds dial and the seconds hand whereby the indications of the other kind of time are brought into conjunction with the seconds hand, and a time measuring movement connected to the system.

4. The combination of indicating means for showing sidereal minutes and hours, indicating means for showing mean solar minutes and hours, a seconds hand, a revolving seconds dial, a group of gearing by which the indicating means for the sidereal and mean solar minutes and hours and the seconds dial are properly related, a second set of gearing through which the seconds hand is driven, and a frictional connection between an element of each group of gears, whereby the indicating means connected to the first group of gears may be concurrently set independently of the seconds hand.

5. The combination of indicating means for showing sidereal minutes and hours, indicating means for showing mean solar minutes and hours, a seconds hand, a revolving seconds dial, a group of gearing by which the indicating means for the sidereal and mean solar minutes and hours and the seconds dial are properly related, a second set of gearing through which the seconds hand is driven, a frictional connection between an element of each group of gears whereby the indicating means connected to the first group of gears may be concurrently set independently of the seconds hand, and means connected with the second group of gears for concurrently setting all of the indicating means.

6. The combination of indicating means for showing sidereal and mean solar time and connecting gears having numbers of teeth which are factors of numbers in a ratio represented by the formula $$\frac{46751a}{46879a}+\frac{1461b}{1465b}+\frac{365c}{366c}$$

in which the last terms in each member of the ratio are small in comparison with the first term.

7. In an indicating means for showing sidereal and mean solar time in units of the same denomination the combination of a hand which is spaced according to one kind of time, a revolving dial for the hand bearing indications for the other kind of time and connecting gears between the hand and dial which are factors of the difference and one of the numbers in a ratio represented by the formula $$\frac{46751a}{46879a}+\frac{1461b}{1465b}+\frac{365c}{366c}$$

in which the last terms in each member of the ratio are small in comparison with the first term.

SAMUEL W. BALCH.